Patented Aug. 28, 1934

1,971,888

UNITED STATES PATENT OFFICE 1,971,888

CATALYTIC PROCESS FOR MANUFACTURING PHTHALIC ANHYDRIDE

Alfred Wohl, Danzig-Langfuhr, Germany, assignor to I. G. Farbenindustrie Aktiengesellschaft, Frankfort-on-the-Main, Germany, a corporation of Germany No Drawing. Application July 9, 1920, Serial No. 395,026. In Germany June 28, 1916

8 Claims. (Cl. 260—123)

I have found that phthalic anhydride, phthalic acid, benzoic acid and naphthaquinones can be produced by passing a mixture of naphthalene vapor with free oxygen or oxygen-containing gases as for example air over a suitable catalyst whilst maintaining the temperature below red heat. If, for instance, air containing naphthalene vapor is passed over oxids of vanadium, which may be distributed upon powdered pumice stone or other carrier, long, slightly yellowish colored needles of phthalic anhydride will sublime at a temperature as low as about 300 degrees centigrade. A white sublimate of substantially pure phthalic anhydride can be directly obtained at say from 380 to 400 degrees centigrade if the speed of the air-mixture and its naphthalene contents are suitably regulated. Other oxygen-carrying catalyzers may also be used, such for instance as molybdenum oxids. The most favorable conditions as to the temperature, velocity, contents of oxygen, naphthalene and moisture of the gas-mixture passed over the catalysts must be ascertained in each single case. The process can be carried out at ordinary, raised or diminished pressure, and catalytic periods may alternate with periods for regeneration of the catalyst, by simply passing an oxygen-containing gas over the catalyst while maintaining same at an elevated temperature; the preferred temperature is from about 300 degrees to about 580 degrees centigrade.

In order to further illustrate the process, I give the following examples to which, however, the invention is not confined.

Vanadic acid serving as catalyst is deposited on the carrier, e. g. in the state of a colloidal solution. This can be prepared by grinding ammonium vanadate with a quantity of acid, preferably nitric acid, slightly exceeding the required amount, and washing. The precipitate, after suspension in water, is put into boiling water. In order to avoid a too thorough soaking of the pumice stone, or other carrier, with the solution, I prefer to gelatinize the solution before its application, as for example with starch solution or, preferably, with very finely divided, washed animal charcoal (blood charcoal). By these admixtures which are burned away later, the surface of the catalyst is further loosened and its full efficiency quickly obtained. The efficiency is increased, the other conditions being equal, according to the quantity of vanadic acid applied, but not proportionally, the action of a given weight of the catalyst being, within certain limits, far greater in case of thinner layers being used.

Into a dilute colloidal solution of one part of vanadic acid, prepared in the aforesaid manner, I introduce for instance 5 parts of animal charcoal and afterwards 100 parts of granulated pumice stone. The mass is then dried and heated in a current of air to from about 300 to 350 degrees centigrade until the carbon dioxid formed nearly disappears. The catalyst is then ready for use. 20 grams of this material (containing 0.2 gram of vanadic acid) spread in a layer of 20 centimetres are heated in a tube to about 370 degrees centigrade (furnace temperature). If a current of air, dried by means of concentrated sulfuric acid be passed over with a velocity of from 6 to 8 litres per hour and carrying 0.85 gram naphthalene per hour (the naphthalene having been vaporized in the air-current at a temperature of 100 or 105 degrees centigrade) 0.8 gram of a sublimate will result comprising 0.55 to 0.6 gram phthalic anhydride, i. e. three times the weight of the catalyst. When the catalyst concentration is higher, the process can be performed at lower temperature and with still less loss. In the course of use, the efficiency of this catalyst becomes stronger to some extent.

Another very active catalyst can be prepared by soaking the pumice grains (20 parts) with a solution of gum (0.75 parts) drying somewhat and then mechanically shaking them with ammonium vanadate (0.5 parts). Or, the latter may be mixed with powdered pumice and formed in a suitable manner.

Another contact mass can be prepared by precipitating ammonium molybdate solution containing blood charcoal onto granulated pumice by evaporating and then heating in a current of air to about 320 degrees centigrade until the coal is burned away. The black mass obtained is very efficient, far more than if the molybdic acid was burnt white by applying a high temperature.

In every case it is essential to keep the temperature below red heat by suitable heating or cooling in order to maintain the efficiency of the catalyst and to avoid destruction of the phthalic anhydride. The quantity of the latter increases to a certain degree, the other conditions being equal, with the velocity of the air-current and its oxygen contents as well as with the temperature. The result of the process is chiefly phthalic anhydride mixed with phthalic acid and with small amounts of naphthaquinones and of benzoic acid. The nature of the product, however, varies depending on the conditions of working, the quantity of naphthaquinone and benzoic acid being sometimes negligible, and unchanged naphthalene may also be contained in the product.

I claim:—

1. The process of manufacturing phthalic anhydride by catalytically oxidizing naphthalene vapor with an oxygen-containing gas by means of a catalyst containing a vanadium oxid, whilst maintaining the temperature below red heat.

2. The process of manufacturing phthalic anhydride by catalytically oxidizing naphthalene vapor with an oxygen-containing gas by means of a catalyst containing a vanadium compound, whilst maintaining the temperature between from about 300 to 580 degrees centigrade.

3. A process for the manufacture of phthalic anhydride, phthalic acid, benzoic acid and naphthaquinones, which process consists in subjecting naphthalene in the gaseous state and mixed with an oxygen-containing gas mixture, to the action of vanadium oxids heated to temperatures ranging from 350° to 550° centigrade.

4. A process for the manufacture of phthalic anhydride, phthalic acid, benzoic acid and naphthaquinones, which process consists in subjecting naphthalene in the gaseous state and mixed with atmospheric air to the action of vanadium oxids heated to temperatures ranging from 350° to 550° centigrade.

5. A process for the manufacture of phthalic anhydride which consists in subjecting naphthalene in the vapor state and mixed with an oxygen containing gas to the action of vanadium oxide at a temperature sufficient to promote the reaction.

6. A process for the manufacture of phthalic anhydride which consists in subjecting naphthalene in the vapor state and mixed with a gas containing free oxygen to the action of vanadium oxide at a temperature sufficient to promote the reaction.

7. A process for the manufacture of phthalic anhydride which consists in subjecting naphthalene in the vapor phase mixed with an oxygen containing gas over an oxide of a metal of the group consisting of vanadium and molybdenum at a temperature sufficient to promote the reaction.

8. A process for the manufacture of phthalic anhydride which consists in subjecting naphthalene in the vapor phase mixed with an oxygen containing gas over an oxide of a metal of the group consisting of vanadium and molybdenum at a temperature of about 300 to about 580 degrees Centigrade.

ALFRED WOHL.

CERTIFICATE OF CORRECTION.

Patent No. 1,971,888.            August 28, 1934.

ALFRED WOHL.

It is hereby certified that error appears in the above numbered patent requiring correction as follows: In the grant and in the heading to the printed specification the residence of the inventor was erroneously described and specified as "Danzig-Langfuhr, Germany" whereas said residence should have been described and specified as --Danzig-Langfuhr, Free City of Danzig--; and in the heading to the printed specification, after the last line thereof, insert the following statement --

(Granted under the provisions of the act of
March 3, 1921; 41 Stat. L., 1313).

and that the said Letters Patent should be read with this correction therein that the same may conform to the record of the case in the Patent Office.

Signed and sealed this 9th day of July, A. D. 1940.

(Seal)

Henry Van Arsdale,
Acting Commissioner of Patents.

naphthalene may also be contained in the product.

I claim:—

1. The process of manufacturing phthalic anhydride by catalytically oxidizing naphthalene vapor with an oxygen-containing gas by means of a catalyst containing a vanadium oxid, whilst maintaining the temperature below red heat.

2. The process of manufacturing phthalic anhydride by catalytically oxidizing naphthalene vapor with an oxygen-containing gas by means of a catalyst containing a vanadium compound, whilst maintaining the temperature between from about 300 to 580 degrees centigrade.

3. A process for the manufacture of phthalic anhydride, phthalic acid, benzoic acid and naphthaquinones, which process consists in subjecting naphthalene in the gaseous state and mixed with an oxygen-containing gas mixture, to the action of vanadium oxids heated to temperatures ranging from 350° to 550° centigrade.

4. A process for the manufacture of phthalic anhydride, phthalic acid, benzoic acid and naphthaquinones, which process consists in subjecting naphthalene in the gaseous state and mixed with atmospheric air to the action of vanadium oxids heated to temperatures ranging from 350° to 550° centigrade.

5. A process for the manufacture of phthalic anhydride which consists in subjecting naphthalene in the vapor state and mixed with an oxygen containing gas to the action of vanadium oxide at a temperature sufficient to promote the reaction.

6. A process for the manufacture of phthalic anhydride which consists in subjecting naphthalene in the vapor state and mixed with a gas containing free oxygen to the action of vanadium oxide at a temperature sufficient to promote the reaction.

7. A process for the manufacture of phthalic anhydride which consists in subjecting naphthalene in the vapor phase mixed with an oxygen containing gas over an oxide of a metal of the group consisting of vanadium and molybdenum at a temperature sufficient to promote the reaction.

8. A process for the manufacture of phthalic anhydride which consists in subjecting naphthalene in the vapor phase mixed with an oxygen containing gas over an oxide of a metal of the group consisting of vanadium and molybdenum at a temperature of about 300 to about 580 degrees Centigrade.

ALFRED WOHL.

CERTIFICATE OF CORRECTION.

Patent No. 1,971,888.                                  August 28, 1934.

ALFRED WOHL.

It is hereby certified that error appears in the above numbered patent requiring correction as follows: In the grant and in the heading to the printed specification the residence of the inventor was erroneously described and specified as "Danzig-Langfuhr, Germany" whereas said residence should have been described and specified as --Danzig-Langfuhr, Free City of Danzig--; and in the heading to the printed specification, after the last line thereof, insert the following statement --

(Granted under the provisions of the act of
March 3, 1921; 41 Stat. L., 1313).

and that the said Letters Patent should be read with this correction therein that the same may conform to the record of the case in the Patent Office.

Signed and sealed this 9th day of July, A. D. 1940.

(Seal)

Henry Van Arsdale,
Acting Commissioner of Patents.